United States Patent [19]
Estrada

[11] Patent Number: 5,599,571
[45] Date of Patent: Feb. 4, 1997

[54] PROCESS FOR PRESERVING LEAFY PRODUCE

[76] Inventor: Joe J. Estrada, 11180 Sanchez St., Castroville, Calif. 95012

[21] Appl. No.: 880,147

[22] Filed: May 6, 1992

Related U.S. Application Data

[63] Continuation-in-part of Ser. No. 446,909, Dec. 6, 1989, abandoned.

[51] Int. Cl.⁶ .......................................................... A23B 7/00
[52] U.S. Cl. ........................ 426/321; 426/262; 426/270; 426/335; 426/531; 426/532; 426/539
[58] Field of Search .............................. 426/321, 34, 262, 426/270, 302, 310, 327, 335, 418, 419, 531, 532, 539

[56] References Cited

U.S. PATENT DOCUMENTS

| | | |
|---|---|---|
| 2,082,573 | 6/1937 | Hall . |
| 2,092,090 | 9/1937 | Sharma . |
| 2,155,923 | 4/1939 | Armstrong . |
| 2,374,210 | 4/1945 | Kalmar . |
| 2,420,322 | 5/1947 | Matarazzo . |
| 2,430,674 | 11/1947 | Hampel . |
| 2,441,305 | 5/1948 | Wilson . |
| 2,503,663 | 4/1950 | Gericke . |
| 2,522,535 | 9/1950 | Pryor . |
| 3,102,777 | 9/1963 | Bedrosian et al. . |
| 3,978,235 | 8/1976 | Schiro . |

OTHER PUBLICATIONS

Baylet et al., Use of a stable hypochlorite solution for the disinfection of fruits and vegetables contaminated with *Vibrio cholerae*, 1972, Bull. Soc. Pathol. Exot., 65(1), 25–30.

Olunloyo (1979) Niger. Jour. Agric. Sci. 1;51–59.

American Chemical Soc., "Chemical Abstracts" Index Guide 1989 A–M, pp. 926G, 1185G, Chem. Abst. Serv., Columbus, OH 43210.

Desrosier, N. W., et al., The Technology of Food Preservation, 1982, pp. 54–57, 340–342, AVI Publ. Co., Westport, CT.

*Primary Examiner*—Leslie Wong
*Attorney, Agent, or Firm*—Townsend and Townsend and Crew LLP

[57] ABSTRACT

This invention relates to a process for preserving leafy produce. The process comprises exposing the produce to be treated for a period of time to a dilute aqueous solution of a preservative composition. The preservative composition comprises sodium or calcium hypochlorite, a chloride salt and water.

6 Claims, No Drawings

PROCESS FOR PRESERVING LEAFY PRODUCE

The present application is a continuation-in-part of application Ser. No. 07/446,909, filed on Dec. 6, 1989, now abandoned the full disclosure of which is incorporated herein by reference.

BACKGROUND OF THE INVENTION

1. Field of the Invention

This invention relates to a process and a composition for treating leafy produce through the application of a preservative aqueous solution to said leafy produce thereby extending the period of freshness before discoloration and wilting occurs.

The produce industry, being quite aware of the problems associated with discoloration, wilting and other symptoms of spoilage, has attempted to maintain a fresh, appealing appearance of produce as long as possible. It is well known that leafy produce, such as spinach, lettuce, chard, and the like, suffer from such spoilage after even relatively short periods of storage. Consequently, the produce-treating industry is constantly faced with unnecessarily high costs due to spoiling of produce.

The various methods which have been proposed to overcome the spoilage problem of non-leafy produce have been primarily directed to the improvement of the color of the produce, rather than maintaining freshness through application of a preservative. These methods that are used are generally designed to bleach the produce and provide a color additive. A number of these prior art methods are somewhat limited in that they have involved the use of acids and other strong chemicals which have a tendency to injure the material being treated or require very careful, critical control of the process to avoid damage to the produce.

The conventional bleaching methods used in the treatment of produce are designed to remove various stains present on the outer skin and to generally lighten the color of the produce to make it more appealing for sale. Many of these previously proposed bleaching methods, especially those involving the use of acid solutions, also tend to char or cause an undesirable reaction between the organic material and the acid constituent of the solution. Consequently, these prior art methods are often not applicable to the treatment of many types of produce and do not materially aid in extending the fresh life.

The use of oxidizing or reducing agents and providing certain color additives or to selectively bleach the produce is generally known in the art. Such oxidizing agents include hydrogen peroxide, sulfur dioxide and sodium-sulfo-para-toluene chloramine. Examples of reducing agents which may be used include copper sulfate, ferrous sulfate, ferrous sulfite, hydrogen sulfide, titaneous chloride and stannous chloride. Sodium hypochlorite is another popular oxidizing agent frequently used in prior art produce treatment processes. This compound is generally used in solutions of sufficient concentrations to cause a bleaching action to occur when the solution is applied to the produce being treated.

2. Description of the Background Art

Prior art methods designed for the bleaching of produce utilize sodium hypochlorite as well as other additives such as hydrogen peroxide, as disclosed in U.S. Pat. No. 2,092,090 to J. N. Sharma and U.S. Pat. No. 2,155,923 to J. A. Armstrong. As disclosed in these two patents, the concentration of sodium hypochlorite, or its equivalent oxidizing agent, is used only in concentrations sufficient to produce a bleaching action on the outer skins of fruits and vegetables. Sodium hypochlorite is not used as a preservative in these prior art methods.

A process employing chlorites for bleaching non-cellulosic organic materials is disclosed in U.S. Pat. No. 2,430,674 to C. A. Hampel. The use of sodium hypochlorite as a preservative is not suggested.

U.S. Pat. No. 3,978,235, to Schiro, discloses the use of sodium hypochlorite in mixture with an alkali earth metal phosphate for preserving produce and cut flowers.

The use of Milton's Solution having a sodium hypochlorite concentration from 50 to 100 ppm and a sodium chloride concentration from 825 to 1650 ppm for anti-fungal treatment of kola nuts is described in Olunloyo (1979) Niger. Jour. Agric. Sci. 1:51–59.

Additional United States patents show various preservative compositions and methods of preserving or maintaining the freshness and color of produce including fruit and vegetables. Such patents include: Hall-U.S. Pat. No. 2,082,573; Sharma-U.S. Pat. No. 2,092,090; Kalmar-U.S. Pat. No. 2,374,210; Matarozzo-U.S. Pat. No. 2,420,322; Wilson-U.S. Pat. No. 2,441,305; Gericke-U.S. Pat. No. 2,503,663; Pryor-U.S. Pat. No. 2,522,535; and Bedrosian-U.S. Pat. No. 3,102,777. Again, while most of these prior art patents show a preservative product or process, they do not show the use of a composition which will react with the produce in an efficient manner having no deleterious effects on either taste, smell or appearance.

SUMMARY OF THE INVENTION

The present invention relates to a process for preserving leafy produce, such as spinach, lettuce, chard, and the like. This process utilizes a composition which inhibits bacterial degradation of the produce and considerably lengthens the time that the produce being treated remains fresh and appealing. More specifically, discoloration and wilting due to the exposure of the produce to atmosphere are considerably delayed through the interaction of the produce with the constituents of the composition. Surprisingly, the composition is able to inhibit such microbial degradation and wilting without itself discoloring or otherwise degrading the sensitive leafy produce.

The preservative composition utilized by the method of this invention comprises sodium hypochlorite or calcium hypochlorite and a chloride salt, that is, a salt containing the $Cl^-$ ion, such as potassium chloride or sodium chloride. Sodium hypochlorite and sodium chloride in combination are preferred. This composition provides a superior, longer-lasting preservative action to produce than prior art compositions. The concentrations of both sodium hypochlorite and chloride salt are critical, with sodium hypochlorite being present at from about 25 ppm to 100 ppm and chloride salt (in the form of NaCl) being present at from 100 ppm to 500 ppm. Higher salt concentrations have been found to actually cause discoloration of the leafy produce and are thus unacceptable.

The process involves subjecting the leafy produce to an aqueous solution of the preservative composition having sodium hypochlorite and sodium chloride concentrations as set forth above. Complete immersion for a predetermined period of time of the produce in a "bath" of the preservative solution while the bath is maintained at room temperature is preferred. This time range of immersion or exposure of the composition to the produce is approximately 0.5 to 30 minutes. Under normal conditions, 5 minutes of immersion are usually sufficient, depending, of course, upon the concentration of composition used and the type of produce being treated. Care must be taken if an extended period at high concentrations is used because the produce may be "burned."

Although an immersion-bath process is the most desirable, one could also utilize an appropriate spray device. For such, the produce would preferably pass under a plurality of spray heads using any conventional conveyor arrangement. Ideally, the unused solution passing through the conveyor is collected in a collection tank and the solution is recirculated back to the spray heads. When utilizing a spray device, the produce under treatment should not be maintained within the spray area for a period longer than approximately 30 minutes. However, as stated above, the maximum optimum period of exposure would be in the range of five minutes.

Storage of the treated produce at reduced temperatures thereafter serves to aid in the initial preservation process and further extends the life of the produce being treated. As is well known, heat tends to promote microbial growth and break down chemical structure of produce exposed to atmosphere. The combination of first subjecting the produce to preservative composition and then storing the producing after treatment in a relatively cold environment, in the range of about 35° F. to about 55° F., therefore comprises an extremely efficient method for extending the fresh life of the leafy produce. It reduces unnecessary cost due to waste and spoilage.

For a fuller understanding of the nature of the objects of the invention, reference should be had to the following detailed description.

DESCRIPTION OF THE SPECIFIC EMBODIMENTS

The process of the invention for preserving leafy produce, comprises exposing the produce to be treated to a dilute aqueous solution of the preservative composition of the present invention.

This preservative composition comprises an aqueous solution having from 10 to 100 ppm sodium or calcium hypochlorite and from about 100 to 500 ppm chloride salt (measured as NaCl) with the remainder being water. The preferred composition will comprise 25 ppm to 75 ppm sodium or calcium hypochlorite and 200 ppm to 300 ppm chloride salt. Frequently, the compositions utilized in the method of the present invention will be prepared as concentrated solutions which may then be diluted with water to provide for final concentrations as set forth above.

It has been found that leafy produce are particularly sensitive to the concentration of chloride salt, e.g., NaCl, present in the preservative composition. Minimum concentrations of 100 ppm are necessary in order to achieve the desired preservative effect. Concentrations up to about 500 ppm are generally also useful, but concentrations above 500 ppm have been found to be substantially less effective in preserving leafy produce over extended periods of time. Experimental results showing the criticality of the upper range of sodium chloride concentration are provided in the Experimental section hereinafter.

The temperature at which the solution is maintained may be varied and has little practical effect over the outcome of the process as long as the temperature range of the bath is maintained between about 34° F. and about 85° F.

In the practice of the present invention, therefore, the process for preserving produce comprises:

a) forming a preservative composition comprising sodium or calcium hypochlorite, a chloride salt and water;

b) optionally forming a dilute aqueous solution from a concentrate by adding the preservative composition to water;

c) subjecting the produce to the dilute aqueous solution for a period of time from about 0.5 to about 30 minutes; and d) removing the produce from the dilute aqueous solution.

The process may further comprise drying the treated produce and storing it at a reduced temperature.

Treatment of the leafy produce comprises either immersing the produce in or spraying the produce with the dilute aqueous solution from 0.5 to 30 minutes, with an optimum period being up to about 5 minutes. Immersion is preferred. Subsequent to drying, the treated produce is stored at a reduced temperature in the range of from about 35° F. to about 45° F. Ideally, dependent upon the particular produce being treated, the preferred storage temperature is from about 38° F. to about 42° F.

The following examples are offered by way of illustration and are not to be construed as limiting the scope of the invention.

EXPERIMENTAL

EXAMPLE 1

A preservative composition was prepared by adding 100 g of sodium chloride to 26 oz. of water, followed by addition of 102.4 oz. of a 12.5% solution of sodium hypochlorite. This gave a composition comprising, by weight, 10% of sodium hypochlorite, 2.2% of sodium chloride and 87.8% of water.

A dilute solution of the composition for treatment of produce was prepared by mixing 1 oz. of the above preservative composition into 16.5 gal. of water. This gave a solution containing 50 ppm of sodium hypochlorite and 560 ppm of sodium chloride.

EXAMPLE 2

An aqueous solution for treatment of produce was prepared by mixing 1 oz. of sodium chloride into 16 gal. of water, and then adding 1 oz. of a 10% solution of sodium hypochlorite. The resulting solution contained 50 ppm of chlorine and 800 ppm of sodium chloride.

EXAMPLE 3

Each of spinach, green chard, endive and green leaf lettuce was subjected to cleansing treatments of one of four types (percent is by weight): (a) 10% sodium hypochlorite and 90% water, (b) 10% sodium hypochlorite, 0.22% sodium chloride and 89.78% water, (c) 10% sodium hypochlorite, 2.2% sodium chloride and 87.8% water, (d) 10% sodium hypochlorite, 0.05% sodium hexametaphosphate and 89.95% water. Treatment (d) is the composition of U.S. Pat. No. 3,978,235. A fifth group of produce was left untreated as a control.

A dilute aqueous solution of each of the treatment compositions was prepared by adding 1 oz. of composition to 16.5 gal. of water. One head of each of spinach, green chard, endive and green leaf lettuce was soaked in the dilute treatment solution for 5 minutes. They were then removed and dried and placed in a cold box at 40°–42° F.

At 3, 6 and 14 days after treatment, the produce was rated based on crispness, color and appearance of freshness in a blind test by four individuals. At each time period, treatment (c) was rated as excellent on all produce by all raters. Produce treated by all other treatments showed marked deterioration during the same period.

The results are presented in Table 1 below.

TABLE 1

| Treatment | Score[1] | | |
|---|---|---|---|
| | 3 days | 6 days | 14 days |
| (a) 10% sodium hypochlorite | 3 | 4 | 4 |
| (b) 10% sodium hypochlorite 0.22% sodium chloride | 3 | 3 | 4 |
| (c) 10% sodium hypochlorite 2.2% sodium chloride | 1 | 1 | 1 |
| (d) 10% sodium hypochlorite 0.05% sodium hexametaphosphate | 2 | 2 | 3 |
| (e) Control | 4 | 4 | discarded |

[1] 1 = excellent appearance, 2 = good, 3 = fair, 4 = poor

EXAMPLE 4

A series of test preservative compositions were prepared comprising aqueous solutions of sodium hypochlorite at 50 ppm and sodium chloride at concentrations from 120 ppm to 820 ppm. A control solution comprising 900 ppm sodium chloride and no sodium hypochlorite was also prepared. The test solutions were used to treat fresh bunched spinach, where stems were cut at 2 to 3 inches. The bunched spinach was washed in the test solutions and dried by spinning for 45 seconds. After drying, the spinach was bagged in plastic bags. Sodium chloride concentrations were confirmed with a Tailor Test Kit (K-1767) with chromatic indicator and silver nitrate reagent. Distilled water was used in all tests in order to carefully control sodium chloride content. The test results are set forth in Table 2 below.

TABLE 2

| Test No. | Sodium Hypo-chlorite | Sodium Chloride | Score[1] | | | | | |
|---|---|---|---|---|---|---|---|---|
| | | | Day 1 | Day 6 | Day 8 | Day 10 | Day 12 | Day 13 |
| 1 | 50 ppm | 820 ppm | 1 | 1 | 2 | 3 | 4 | 4 |
| 2 | 50 ppm | 760 ppm | 1 | 1 | 2 | 3 | 4 | 4 |
| 3 | 50 ppm | 660 ppm | 1 | 1 | 2 | 2 | 2 | 3 |
| 4 | 50 ppm | 560 ppm | 1 | 1 | 1 | 1 | 1 | 2 |
| 5 | 50 ppm | 440 ppm | 1 | 1 | 1 | 1 | 1 | 1 |
| 6 | 50 ppm | 340 ppm | 1 | 1 | 1 | 1 | 1 | 1 |
| 7 | 50 ppm | 220 ppm | 1 | 1 | 1 | 1 | 1 | 1 |
| 8 | 50 ppm | 120 ppm | 1 | 1 | 1 | 1 | 1 | 1 |
| 9 | 0 ppm | 900 ppm | 1 | 1 | 2 | 3 | 4 | 4 |

[1] 1 = excellent appearance, 2 = good, 3 = fair, 4 = poor

As can be seen from these data, the compositions of the present invention can provide excellent preservation of the appearance of leafy produce over extended periods of time. Moreover, it can be seen that the concentration of sodium chloride is critical, with concentrations above about 500 ppm having reduced preservative capabilities when compared with those in the preferred range of the present invention from 100 ppm to 500 ppm.

Although the foregoing invention has been described in some detail by way of illustration and example for purposes of clarity of understanding, it will be obvious that certain changes and modifications may be practiced within the scope of the appended claims.

What is claimed is:

1. A method for inhibiting wilting and discoloration of leafy produce, said method comprising:

exposing the leafy produce to an aqueous solution comprising sodium or calcium hypochlorite at 10 ppm to 100 ppm and potassium or sodium chloride salt at 100 ppm to 500 ppm; and storing the leafy produce at a reduced temperature.

2. A method as in claim 1, wherein the aqueous solution comprises sodium hypochlorite at 25 ppm to 75 ppm and sodium chloride at 200 ppm to 300 ppm.

3. A method as in claim 1, which further comprises the steps of drying the treated leafy produce after removal from the aqueous solution.

4. A method as in claim 3, wherein the reduced temperature is in the range of from about 35° F. to about 45° F.

5. A method as in claim 4, wherein the reduced temperature is about 40° to 42° F.

6. A method as in claim 1, wherein the produce is maintained at the reduced temperature for at least 10 days prior to use.

* * * * *